United States Patent [19]

Schumacher

[11] Patent Number: 4,486,507
[45] Date of Patent: Dec. 4, 1984

[54] TRANSPARENT, SHRINKABLE FILM, CONSISTING OF ONE OR SEVERAL LAYERS

[75] Inventor: Rudolf Schumacher, Viersen, Fed. Rep. of Germany

[73] Assignee: Feldmühle Aktiengesellschaft, Dusseldorf, Fed. Rep. of Germany

[21] Appl. No.: 375,210

[22] Filed: May 5, 1982

[30] Foreign Application Priority Data

May 14, 1981 [DE] Fed. Rep. of Germany ....... 3119217
May 14, 1981 [DE] Fed. Rep. of Germany ....... 3119142

[51] Int. Cl.³ .............................................. B32B 27/10
[52] U.S. Cl. ................. 428/476.1; 525/432; 428/476.3
[58] Field of Search ............. 525/432; 428/474.7, 428/474.9, 476.9, 476.1

[56] References Cited

U.S. PATENT DOCUMENTS 3,646,156 2/1972 Schneider et al. ................. 525/432
3,983,306 9/1976 Nielinger ............................ 428/474

FOREIGN PATENT DOCUMENTS 234743 7/1959 Australia .
103818 6/1982 Japan .
1557785 12/1977 United Kingdom .

Primary Examiner—George F. Lesmes
Assistant Examiner—E. Rollins Buffalow
Attorney, Agent, or Firm—Toren, McGeady and Stanger

[57] ABSTRACT

A transparent, shrinkable film composed of at least one layer which is a mixture of

85-10 weight percent of a linear polyamide, linear copolyamide, or an elastomeric component, and

15-90 weight percent of a partially aromatic polyamide or partially aromatic copolyamide.

The films of the present invention can be shrunken at economically feasible temperatures, shrink in such a way so as not to damage the goods encased therein and also possess desirable transparency and gas permeability properties.

16 Claims, 11 Drawing Figures

TRANSPARENT, SHRINKABLE FILM, CONSISTING OF ONE OR SEVERAL LAYERS

BACKGROUND OF THE INVENTION

1. Field of the Invention

The invention relates to a transparent, shrinkable film, consisting of one or several layers, in which the one layer or, in the case of several layers, at least one of the layers consists of polyamide.

2. Description of the Prior Art

Polyamide films are known as single layer as well as multilayer films and are in use on a large scale in the packaging industry, especially for the packaging of foods. Polyamide films are used especially because of their great strength and their low permeability to oxygen. In conjunction with polyolefin films, that is, as multilayer films, they have, besides the high strength, good heat sealing properties which, in conjunction with the high melting point of the polyamide, lead to an easy processibility and secure sealing. In this connection, the polyolefin layer is taken as the inner layer of the packaging material, that is, the easily sealable layers lie against each other, while the polyamide layer, as outer layer with the higher melting point, prevents adhesion to the hot sealing block. Moreover, polyolefin layers have a significantly lower moisture permeability than polyamide, so that the two plastics complement each other outstandingly and the multilayer film of polyamide and polyolefin is almost the ideal packaging material film. The disadvantges of previous polyamide films as shrinkable films, irrespective of whether they are used as multilayer films or as single film, are due on the one hand to their inadequate shrinkage behavior or their slight stretchability at justifiable temperatures and, on the other hand, to their frequently deficient transparency.

Various proposals have therefore already been made for using polyamide films for shrinkable packaging material or to adapt it to this purpose. For example, German Auslegeschrift No. 1,769,510 describes a multilayer film of polyamide and polyethylene made by the coextrusion process, in which the film may be stretched monoaxially or biaxially. German Auslegeschrift No. 2,352,553 uses a similarly constructed multilayer film of linear polyamide or linear copolyamides and polyethylene as sausage skin, the sausage skin being stretched in the longitudinal direction in order to improve the shrinkage. According to German Offenlegungsschrift No. 2,850,181, a tubular film of a mixture of an aliphatic, that is, a linear polyamide and an ionomeric resin and/or modified ethylene/vinyl acetate copolymers is proposed for the same purpose. With the exception of special purposes, none of these proposals has been successful in the market, because the shrinkability of these films is too slight, the expenditure for the work of stretching is large and moreover because they have an inadequate transparency.

The shrinkable film, described in German Pat. No. 1,461,842, is built up from aromatic polyamide components such as terephthalic acid and branched aliphatic diamines, that is, it consists of a partially aromatic polyamide, which is stretched at temperatures of 150° to 160° C. This film has a better shrinkage behavior, but has the disadvantage that the stretching temperatures, which must be used, are very high and, above all, that the shrinkage temperatures of 170° to 190° C., which must be used, are too high for most of the goods, which are to be shrink-wrapped, and harm the material packaged.

Apart from shrinkability, further essential requirements, which such a packaging film must fulfil, are a good transparency, without at the same time being brittle. As far as possible a packaging film should be crystal-clear and glossy in order to set off the materials packaged therein as advantageously as possible. At the same time, it must not be brittle, as is the case with film of German Pat. No. 1,461,842, so that there occurs no damage to the film or the goods themselves due to the action of mechanical stresses, for example, during transport.

In order to improve the transparency, it has already been proposed that an amorphous structure be built up by the polycondensation of different monomers. For example, a composite film of polyamide and polyethylene was proposed in German Offenlegungsschrift No. 2,309,420, in which the polyamide base consists of copolymers of ε-caprolactam, 3-aminomethyl-3,5,5-trimethylcyclohexylamine and isophthalic acid, the proportion of the latter being less than 15 weight percent.

German Offenlegungsschrift No. 2,538,892, which also relates to a multilayer film of polyethylene and polyamide, has in mind that, as polyamide, a copolyamide of ε-caprolactam and AH salt—a polycondensate of hexamethylenediamine and adipic acid—is coextruded together with polyethylene. The objective of both proposals is to improve the transparency. These multilayer films with a polyamide layer of a copolymer of the above-given monomeric components however have inadequate shrinkage capabilities.

The state of the art accordingly does give advice here and there how the one or the other property, for example the shrinkability or the transparency, can be improved. There is, however, no indication in any of the publications in respect to how a film may be produced, which can be shrunk at temperatures which are economically feasible and do not damage the goods, and nevertheless retains all the remaining desirable properties, such as transparency, impermeability to gas, etc.

SUMMARY OF THE INVENTION

I have discovered a shrinkable polyamide film possessing all of the following desired properties.

1. Good shrinkability at relatively low temperatures;
2. Stretchability at relatively low temperatures;
3. Stretchability with not too high an expenditure of force;
4. Retention of the good physical properties of the polyamide, such as toughness elasticity or flexibility, gas tightness, vacuum moldability;
5. Good transparency and high surface gloss;
6. Good heat-sealing properties as a multilayer film, that is, for example, in combination with polyolefins, which usually form the heat seal, in conjunction with a polyamide, which has such a high softening point, that adhesion to the heat-sealing tools is avoided; and
8. A high shrinkage force, in order to ensure that the material packaged is enveloped tightly.

More particularly, the film of the present invention is a transparent, shrinkable film, consisting of one or several layers, wherein at least one of the layers is a polyamide composed of a mixture of 85 to 10 weight percent of a linear polyamide, or a linear copolyamide, or an elastomeric component, and 15 to 90 weight percent of a partially aromatic polyamide, or a partially aromatic copolyamide, which film is stretched at temperatures below 120° C.

DESCRIPTION OF THE PREFERRED EMBODIMENTS

As used herein, linear polyamides are defined as quite generally polyamides, such as, polyamide 6, polyamide 66, polyamide 610, polyamide 11, polyamide 12, etc., that is, a polyamide built up exclusively of aliphatic components.

Linear copolyamides are understooood to be, for example, such copolyamides as copolyamide 6/66. 6/12 and 69. The linear copolyamides may also be plasticized, for example, by containing a proportion of monomers, such as, for example, ε-caprolactam. This has the advantage that the flexibility of the film is improved further and that the stretchability is facilitated. The concept of a linear copolymide also includes such copolyamides, which contain cycloaliphatic and aromatic compounds, such as, for example, isophthalic acid in subordinate amounts, that is, up to 15 weight percent, as described in German Offenlegungsschrift No. 2,309,420, which has already been mentioned. This small proportion of cycloaliphatic and aromatic compounds in the copolyamide merely produces an amorphous structure in the polyamide in broad temperature ranges. These cyclopolyamides, with a small proportion of cycloaliphatic and aromatic compounds, should not be confused with the partially aromatic polyamides, which are defined in greater detail in the following and in which the linear, that is, the aliphatic and the aromatic component are present in accordance with the definition in equimolar amounts.

Elastomeric components include elastomers, such as, polybutadiene and mixtures of polyamides with elastomers, block copolymers of polyether segments and polyamide segments, such as those commercially available under the trade name of "Pebax", and block copolymers of segments of a linear polyamide and segments of elastomers.

Partially aromatic polyamides or partially aromatic copolyamides are understood to be those polyamides, in which either the diamine component or the dicarboxylic acid component is present as an aromatic material—and moreover either in equimolar portions or however at least as the predominant portion in the case of copolymers. Preferredly suitable are the polycondensation products of aliphatic diamines, such as hexamethylenediamine, and aromatic dicarboxylic acids, such as terephthalic acid, especially isophthalic acid.

In particular, the following as partially aromatic polyamides may be used in the present invention:

Polycondensates from diamines, such as ethylenediamine, hexamethylenediamine, decamethylenediamine, dodecamethylenediamine, 2,2,4- and/or 2,4,4-trimethylhexamethylenediamine, m- and/or p-xylylenediamine with dicarboxylic acids, such as, isophthalic acid and terephthalic acid.

When the aromatic component is in the diamine component, aliphatic dicarboxylic acids, such as oxalic acid, adipic acid, sebacic acid, etc. may be used as the carboxylic acid components.

Fully aromatic polyamides, such as, for example, the aramides, are unsuitable for the inventive use.

As already mentioned, a part of the acid component as well as of the amine component of this equimolar aromatic portion of the partially aromatic polyamides may be replaced by appropriate nonaromatic materials. In each case however, the predominant portion of the equimolar amount, which represents the partially aromatic material, must be partially aromatic. Using an example as illustration, this means that:

In the case of isophthalic acid as partially aromatic component, up to 49 mole percent may be replaced by aliphatic dicarboxylic acids for example, such as, adipic acid.

The elastomeric component, which can be used instead of the linear polyamide or copolyamide or together with this, may however also by used in the form of a previously made mixture of a partially aromatic polyamide with an elastomer such as polybutadiene or nitrile rubber.

The inventive film, with a polyamide layer of a mixture of linear polyamide and/or copolyamide and or an elastomeric component on the one hand and with partially aromatic polyamide and/or partially aromatic copolyamide on the other, which is stretched at temperatures below 120° C., is distinguished by an outstanding shrinkability and a high shrinkage force at relatively low temperatures already. With this film it is possible to shrink-wrap temperature-sensitive goods gently, that is, at temperatures at which the wrapped material is not yet damaged. As a consequence of the high shrinkage force, the shrink-wrapped goods are enveloped in an optimum manner, even in the case of different dimensions or irregular shapes, without the occurrence of undesirable folds. This has the further advantage that, when packing meat and meat products, the secretion of meat juice is prevented, with the further advantage that the appearance of the package and the durability of the shrink-wrapped goods are improved. In addition, they have the advantage that stretching, that is, the stretchability, is possible at low temperatures and that the force expended is relatively small, which has the advantage of saving energy and subjecting the film to a slight thermal stress.

Nevertheless, the good physical properties of polyamides and copolyamides, which are well known, are largely retained, as for example the property of toughness elasticity or flexibility, which is so important for the strength of the package, and the properties of gas tightness and vacuum moldability on conventional packaging machines, which are equally important for the packaging of foods. In addition, the film is characterized by an improved transparency and a high surface gloss, which in turn promote considerably the overall optical impression of the package produced from the film.

Figure 4:
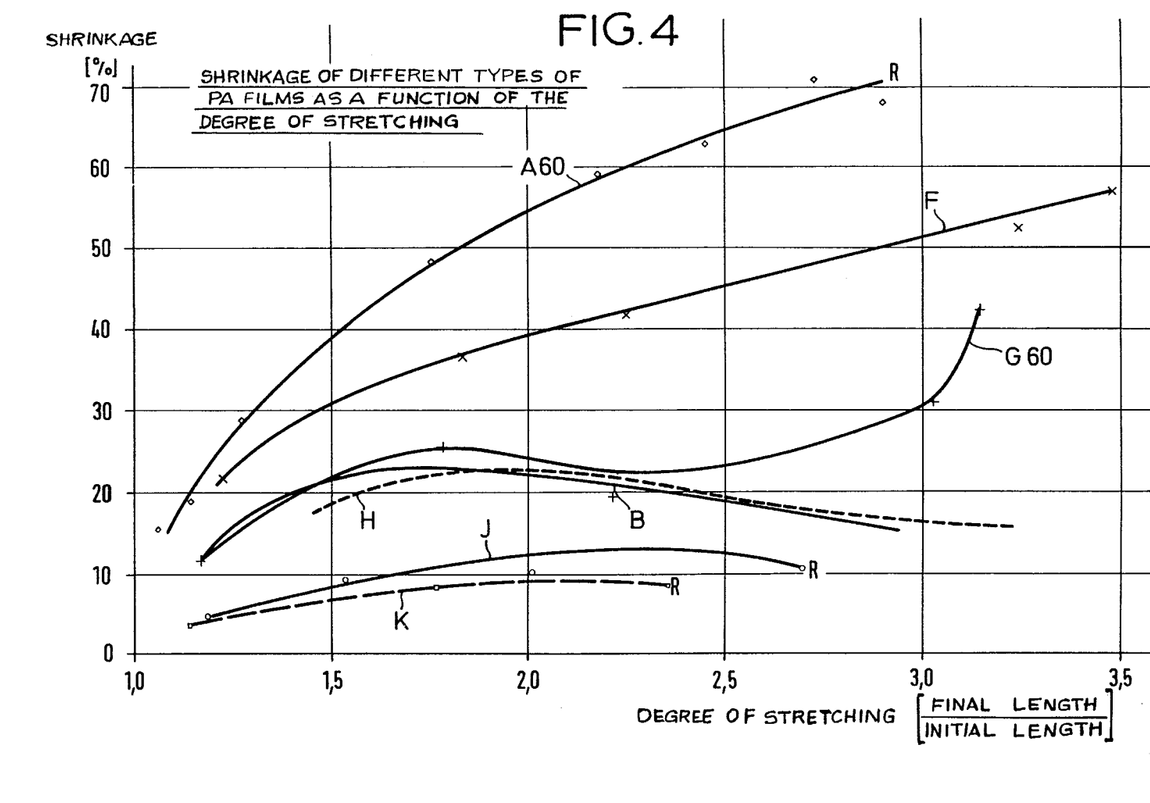

The good shrinkability and the high shrinkage force attained of the inventive film are all the more surprising since, at the stretching and shrinkage temperatures aimed for, films of the components of the mixture by themselves exhibit decidedly poor stretching and shrinkage behavior. For example, curves J and K of FIG. 4 show the degree of stretching and the shrinkage behavior of two polyamide films of partially aromatic polyamides in uniaxial and biaxial shrinkage experiments. In this case, it turns out that the films reach their yield point already at a degree of stretching of 2.3 and 2.7 respectively and then tear. The shrinkability is also extremely slight.

Figure 1:
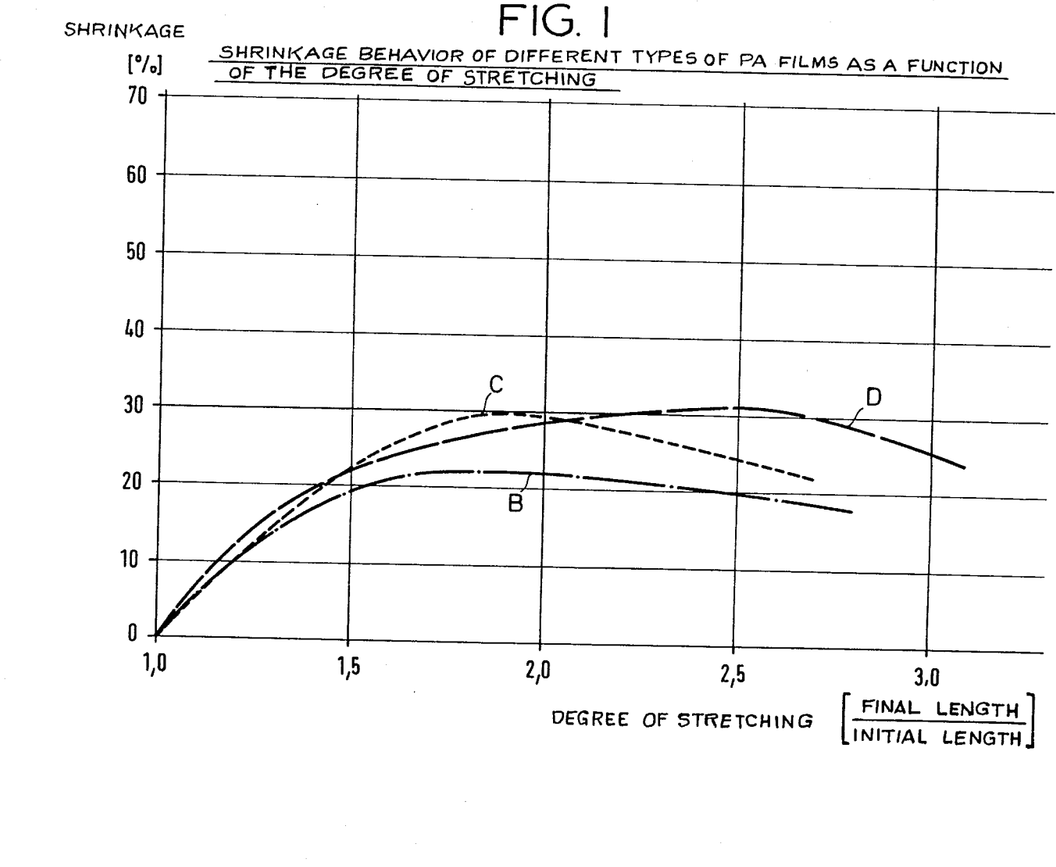
FIGS. 1, 4, 10 and 11 are graphs of the variation of shrinkage behavior with the degree of stretching.

Curve B in FIGS. 1 and 4 shows the stretching and shrinkage behavior of pure polyamide, curve C in FIG. 1 shows the same for pure copolyamide 69. The curves show that the shrinkage behavior of the polyamides or copolyamides admittedly is somewhat better than that of the partially aromatic polyamides but, in the final analysis, does not satisfy the requirements of the packaging industry.

On the other hand, curves G 60, F and A 60 show that, in the case of films of mixtures of linear polyamide 6 with different high proportions of a partially aromatic polyamide, namely a polycondensate of hexamethylenediamine and isophthalic acid in equimolar amounts, significantly better shrinkage values are obtained, the shrinkage values being all the better, the higher the proportion of a partially aromatic polyamide. For instance, curve A 60 in FIG. 4, in which the proportion of partially aromatic polyamide is 75%, shows the best shrinkage behavior.

Preferred are films of mixtures of 80 to 40 weight percent of linear polyamide and/or linear copolyamide and/or elastomeric components with 20 to 60 weight percent of partially aromatic polyamide and/or partially aromatic copolyamide. The range of 20 to 60 weight percent of partially aromatic polyamide is preferred in spite of the fact that the shrinkage capability is highest at high proportions of partially aromatic polyamide, because the films already become very stiff and brittle at very high proportions of partially aromatic polyamide.

Figure 2:
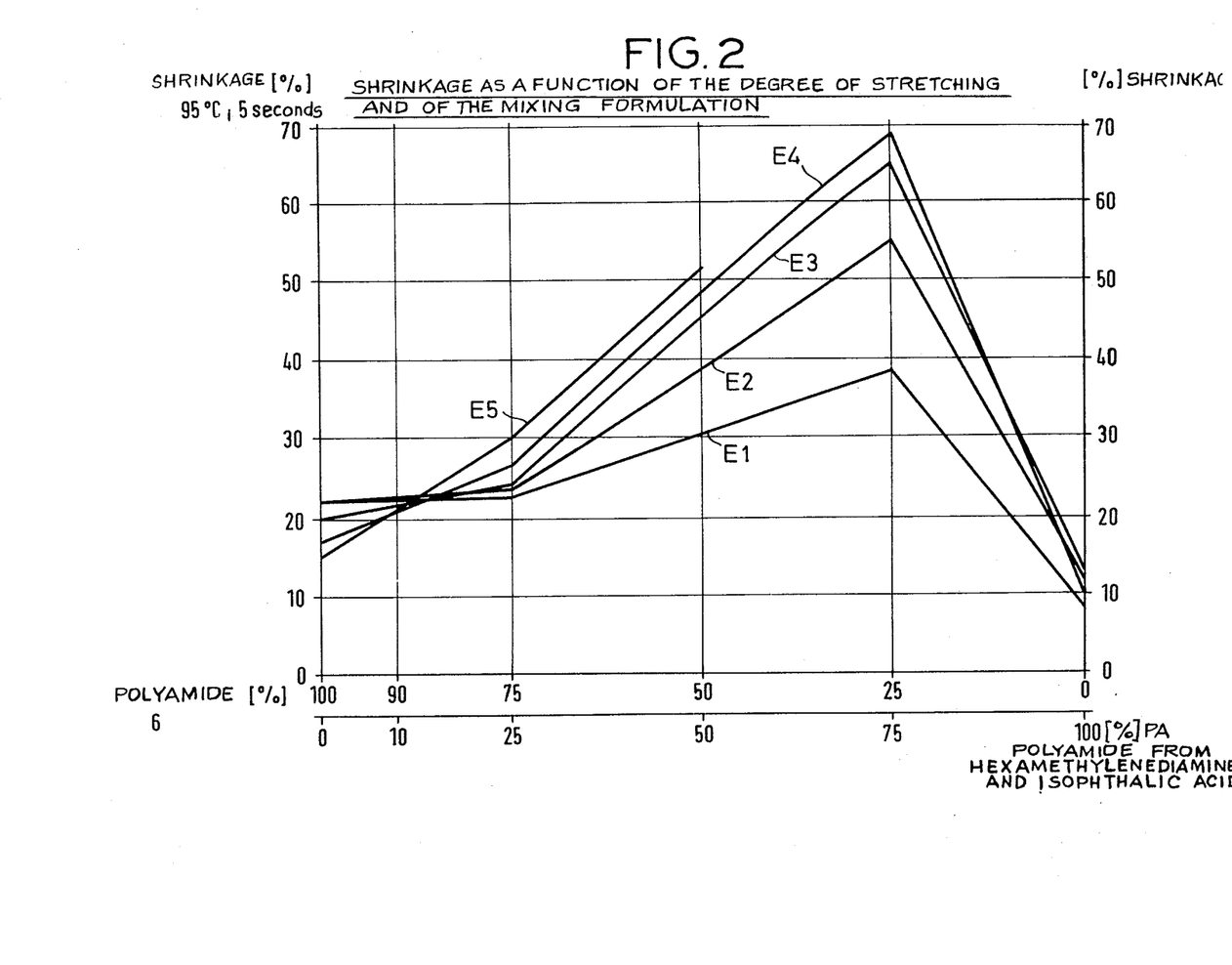
FIGS. 2 and 3 are graphs of the variation of shrinkage with the degree of stretching and the formulation of the mixture.
Figure 3:
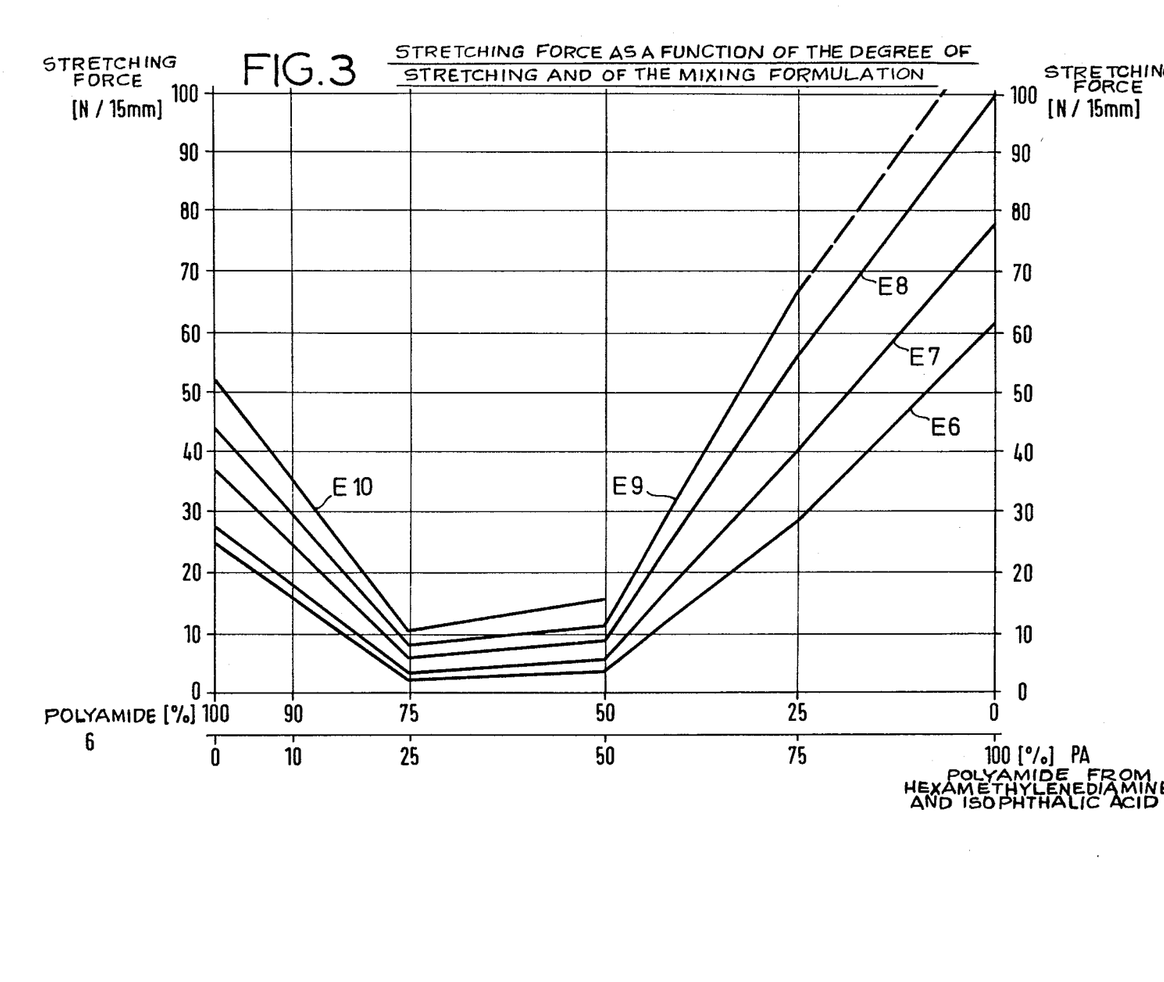
Figure 5:
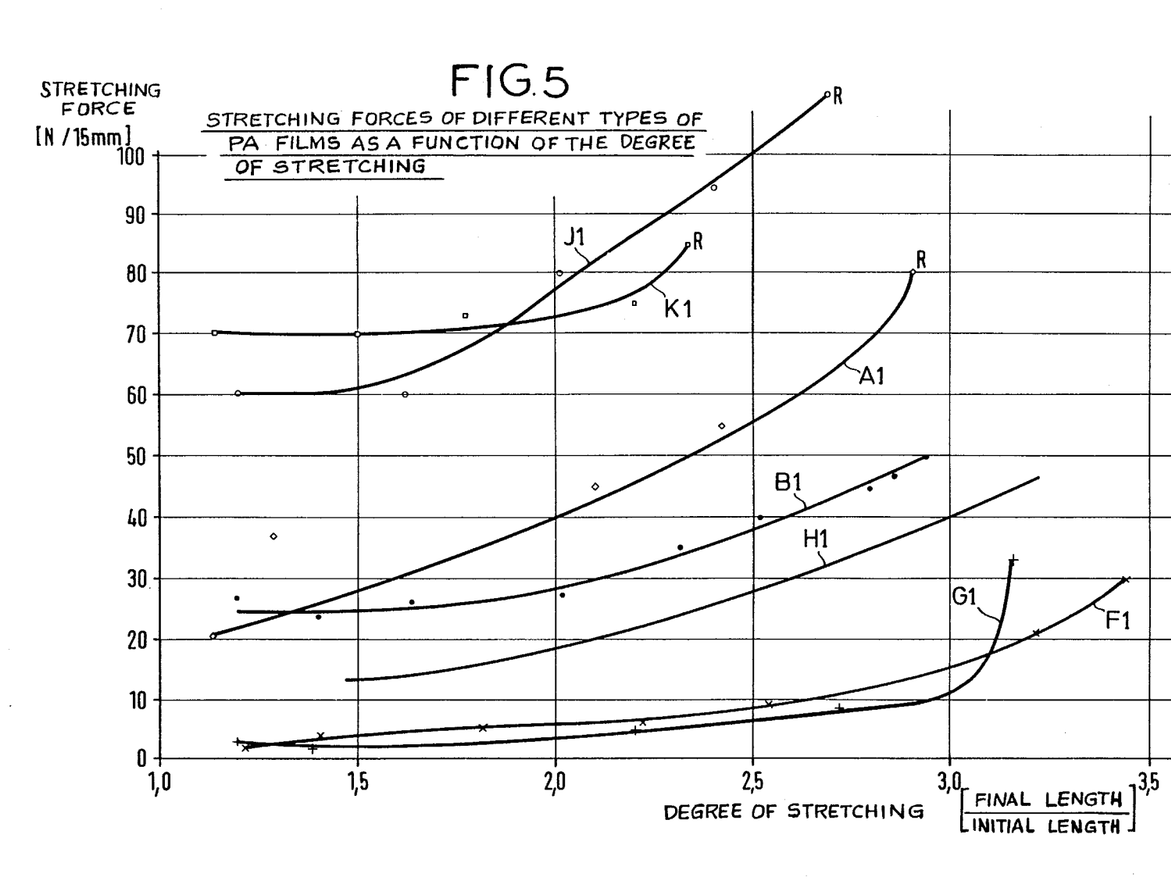
FIG. 5 is a graph of the variation in stretching forces with the degree of stretching.

This maximum in the shrinkability at 75 weight percent of partially aromatic polyamide is also shown in FIG. 2, which shows films of mixtures of partially aromatic polyamide, namely hexamethyleneisophthalamide and polyamide 6, in different percentage compositions and at increasing degrees of uniaxial stretching. On the other hand, the stretching forces, which had to be expended in order to stretch these same films uniaxially and which are shown in FIG. 3, show a minimum in the preferred range, that is, good shrinkage of this film is obtained with relatively little expenditure of force and at a low stretching temperature. FIG. 5 shows, in agreement with FIG. 3, that extremely high stretching forces must be employed at a stretching temperature of 60° C. in the case of pure, partially aromatic polyamides, while these forces are significantly lower in the case of the inventive mixtures.

On the other hand, curve H of FIG. 4 confirms that only 10 weight percent of partially aromatic polyamide does not yet exert an appreciable effect on the shrinkage behavior.

As partially aromatic polyamide, especially hexamethylene isophalamide and polytrimethlhexamethylene terephthalamide have proven their value. These two polyamides produce a crystal-clear film in concentrations as low as 15 weight percent and preferably above 20 weight percent. In addition, the undesirable sticking together during unwinding is reduced, especially in the case where linear copolyamides are the other component of the mixture.

Of the linear polyamides, polyamide 66 is especially preferred for the inventive film, because the admixed partially aromatic polyamides greatly lower the softening range, as a result of which the film tends to stick to the sealing block during sealing, which can lead to interruptions of the packing process. Polyamide 66 on the other hand, because of its high melting point, prevents the softening range of the mixture, as defined in the invention, being lowered excessively.

Those films, which contain amorphous, linear copolyamides, such as copolyamide 6/66, in the mixture of polyamides in addition to polyamide 66 and partially aromatic polyamides, have particularly good properties, because the brittleness, which is caused by the partially aromatic polyamides, is counteracted. A preferred composition of the polyamide layer therefore comprises:

about 40–60 weight percent of polyamide 66,
about 20–30 weight percent of partially aromatic polyamide; and
about 20–30 weight percent of amorphous, linear copolyamide.

As has already been explained, the partially aromatic polyamides may contain elastomeric components as an additional constituent, in which case a three-component mixture is particularly preferred once again here also, namely a mixture consisting of partially aromatic polyamides, linear polyamides and elastomeric components. In this connection, the preferredly used polyamide 66, for example, once again keeps the softening point high, while the elastomeric component improves the flexibility of the film. As elastomeric components, block copolymers of segments of linear polyamide and segments of elastomers such as advisably polyether units, but also finely particulate polybutadiene have especially proven their value.

The stretching of the film, which is an indispensible prerequisite for producing the ability to shrink, is accomplished at temperatures below 120° C., so that the physical properties of the film are not damaged. Advisably it is accomplished at temperatures of 60° to 90° C., lower stretching temperatures being generally preferred and leading to higher shrinkage values. Basically, it is an advantage of the film of the invention, that it can be stretched at such low and gentle temperatures. Although uniaxial stretching already leads to a shrinkable film, wrapping-up all-around, a requirement of practical packing, can be achieved better with a biaxially stretched film.

Uniaxial stretching is understood to be the lengthening of a strip of film under the influence of tensile forces; biaxial stretching, that is, stretching in the longitudinal and transverse directions, is understood to be the enlargement of the area.

The degree of stretching is understood to be the ratio of the remaining length of the strip of film after stretching to the length of the film before stretching. The stretching force is the force which must be employed for a particular degree of stretching.

A special advantage of the inventive film lies therein that a thermoforming process is already adequate for the required stretching of the shrinking film region, thermoforming being a deformation with heating to the desired temperature, and applying a vacuum or optionally compressed air. The advantage of this development of the invention lies therein that it is no longer necessary to subject the film to a special stretching process and that the forces of the thermoforming process are sufficient for the stretching, which is required in order to make the film or the packing material therefrom readily shrinkable.

This means that the expensive process of biaxial stretching can be eliminated. After filling in the material to be wrapped, closing off with a covering film and sealing the edges while evacuating the package, the shrinkability, achieved by the thermoforming process, leads to a package which, after being heated, shrinks skin-tight around the material to be wrapped. In this connection, it is of particular advantage that the inventive film has a higher shrinkage force than known polyamide films. Shrinkage force is defined as the force which such a film is able to apply by itself during the shrinking process against the tensile force acting in a direction opposite to that of the shrinkage. A relatively high shrinkage force is important since, when packaging relatively heavy materials, the force of gravity of the material to be wrapped must be overcome.

The polyamide layer of the invention is of special importance in combination with at least one other layer, because, with such a layer, the negative properties of single films are eliminated and the desirable properties are obtained. For example, polyamide is generally distinguished by high strength, good thermoformability and a relatively high barrier effect against the oxygen of the air. However, the high water permeability and the unfavorable sealing properties are disadvantageous. This can be compensated for in an outstanding manner in conjunction with one or more layers of polyolefin, especially polyethylene and its copolymers, adhering to the polyamide film. Polyolefins are distinguished by a high barrier effect against water vapor and, in the case of polyethylene, by a good sealability. In the case of polyolefin films, an inadequate barrier action towards the oxygen of the air and insufficient strength for many applications are disadvantageous. Both plastics complement each other therefore in an outstanding manner, especially as packaging film for foods.

Figure 11:
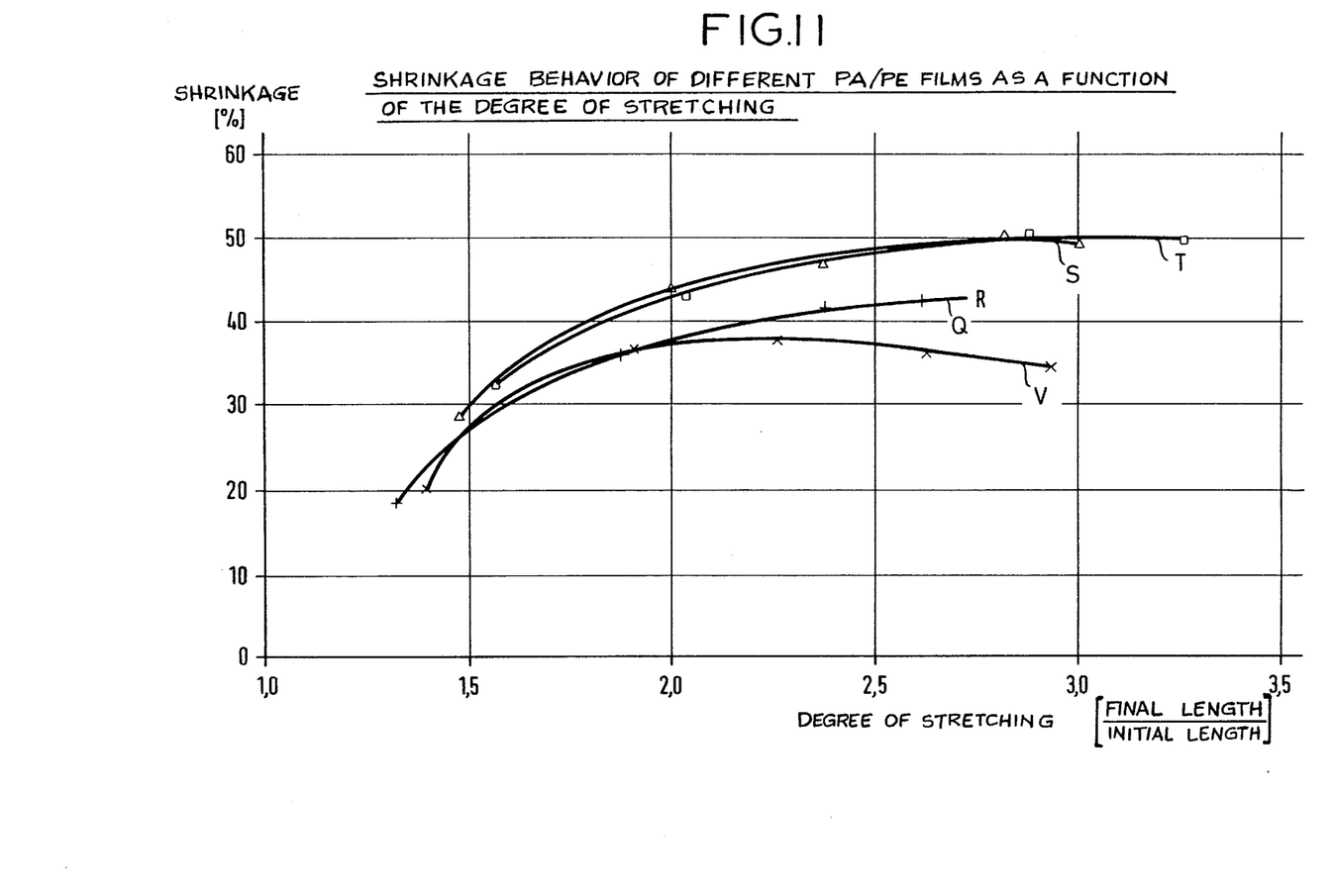

In a preferred embodiment of the invention, the inventive film therefore consists of at least one layer of polyamide of the composition given above and at least one layer of polyolefin. In this connection, it is of particular advantage that the positive properties of the inventive layer of polyamide, which were shown above, are fully retained also in combination with polyolefins. For example, curve V in FIG. 11 shows that a polyamide-polyethylene composite film, consisting of a layer of linear copolyamide with more than 90 weight percent of ε-caprolactam according to curve D of FIG. 1 and a homopolyethylene of low density exhibits the decrease in shrinkability at higher degrees of stretching, which is typical for linear polyamides. On the other hand, curves Q, S and T show better shrinkage values and above all no decreasing tendencies at higher degrees of stretching. In this connection, the polyamide layers of the films of curves S and T are once again prepared from the particularly preferred triple combination of linear polyamide, linear copolyamide and partially aromatic polyamide.

The preferred choice as the polyolefin layer is a polyolefin that, by itself, already has a high shrinkage force and accordingly, in conjunction with a polyamide layer of high shrinkage force, has an excellent shrinkage force on the whole in accordance with the invention, such as, for example and preferredly, may be necessary in the case of thermoformed packages.

Polyethylene is a particularly suitable partner as an additional layer for the inventive polyamide layer, because good heat-sealing properties—dependent on the melt index—produce a good shrinkage force—besides all the other previously known good properties of polyethylene. Advisably, and especially so as to improve the heat-sealing properties and to avoid the negative effects on the outstanding transparency of the polyamide layer, ethylene copolymers or their mixtures are used for the polyolefin layer. These include particularly also those ethylene copolymers of the ionomeric resin type, because these exhibit a great breadth in the variations of their properties spectrum. Accordingly, there are types, which have a high shrinkage force and are selected when this is required, and others, which have only a slight shrinkage force, should the material to be shrink-wrapped not tolerate high shrinkage forces.

Polyolefin layers of a polyethylene type of lower density, preferably of a density less than 0.935 g/m$^3$ and a linear molecular structure, the so-called linear low-density polyethylenes, are also very suitable, because composite films, made from these, are characterized by good heat-sealing properties, a high mechanical strength and a high shrinkage force.

In order to be able to adapt the composite film optimally to the respective application, it is advantageous to produce the polyolefin layer from mixtures of ethylene homopolymers and ethylene copolymers.

The layers can be produced advantageously by coextrusion, and moreover by the coextrusion blow molding process as well by the flat film coextrusion process, which has the advantage of a single operation. The flat film extrusion process is particularly advantageous in those cases where high transparency is important.

The layers may however also be appropiately glued together, especially when one of the layers, due to the nature of the plastic, is less suitable for coextrusion. The usual adhesives, preferably from the polyurethane group, may be used for the gluing.

In the case of a multilayer inventive film, the stretching process, which is required for shrinkability, is preferably carried out so that the composite film as such is stretched. Although stretching of individual layers is possible, such a procedure is laborious and comes into consideration only in isolated cases, for example, in the case of composite films produced by gluing.

The preferred joint stretching is carried out especially also when the stretching is carried out as a thermoforming process, in which case, when a thermoformed container is made, the biaxial stretching, brought about by the thermoforming process, takes place only in the shaped regions of the composite film.

Of course, after a thermoformed package, so produced by thermoforming, is filled with the material to be packed, it still requires a covering film, which closes off the upper side of the container tightly. These lid or closing films are generally of a lesser layer thickness than the lower film, which are used for vacuum thermoforming, since there is no shaping whatsoever, with thinning-out of the layers. For this purpose, composite films of at least two layers are preferably taken, in which case the side facing the vacuum-shaped container consists of a polyolefin, which can be heat-sealed to the inner layer of the container. As a rule, the outer layer consists of high-strength films, such as, for example, biaxially stretched polyester or polypropylene films, cellulose hydrate films or lightproof and gastight films, such as aluminum foil, etc. The gas permeation properties of the covering film should correspond to those of the shaped lower films, so that the package as a whole offers the contents the necessary protection against spoilage.

The captions and keys for the individual Figures are given in the following:

| FIG. 1: | The shrinkage behavior of different types of PA films as a function of the degree of stretching. |
|---|---|
| Curve: | Composition of the film: |
| B | polyamide 6, viscosity 4 |
| C | copolyamide 69 |
| D | copolyamide of more than 90 weight percent of ε-caprolactam, 3-aminomethyl-3,5,5-trimethylcyclohexylamine and isophthalic acid, the latter two monomers together totalling less than 10 weight percent. All measurements at a stretching temperature of 60° C. |
| FIG. 2: | Shrinkage as a function of the degree of stretching and of the formulation of the mixture. The films are mixtures of the polyamides PA 6 and polyhexamethyleneisophthalamide of different percentage compositions. |
| Curve: | |
| E 1 | degree of stretching 1:1.5 |
| E 2 | degree of stretching 1:2.0 |
| E 3 | degree of stretching 1:2.5 |
| E 4 | degree of stretching 1:2.75 |
| E 5 | degree of stretching 1:3.0 All measurements at a stretching temperature of 60° C. |
| FIG. 3: | Stretching force as a function of the degree of stretching and of the formulation of the mixture. The films have the same composition as those of FIG. 2. |
| Curve: | |
| E 6 | degree of stretching 1:1.5 |
| E 7 | degree of stretching 1:2.0 |
| E 8 | degree of stretching 1:2.5 |
| E 9 | degree of stretching 1:2.75 |
| E 10 | degree of stretching 1:3.0 All measurements at a stretching temperature of 60° C. |
| FIG. 4: | Shrinkage as a function of the degree of stretching for different PA films. |
| Curve: | |
| A 60 | 75% polyhexamethyleneisophthalamide 25% polyamide 6, viscosity 4 |
| B | polyamide 6, viscosity 4 |
| F | 50% PA 6, viscosity 4 50% PA from polyhexamethyleneisophthalamide |
| G 60 | 75% PA, viscosity 4 25% PA from polyhexamethyleneisophthalamide |
| H | 90% PA 6, viscosity 3.5 10% PA from polyhexamethyleneisophthalamide |
| J | polyhexamethyleneisophthalamide |
| K | Polytrimethylhexamethyleneterephthalamide All measurements were carried out at a stretching temperature of 60° C. |
| FIG. 5: | Stretching forces as a function of the degree of stretching for different types of PA films. |
| Curve: | |
| A 1 | 75% polyhexamethyleneisophthalamide 25% polyamide 6, viscosity 4 |
| B 1 | polyamide 6, viscosity 4 |
| F 1 | 50% PA 6, viscosity 4 50% polyhexamethyleneisophthalamide |
| G 1 | 75% PA, viscosity 4 25% polyhexamethyleneisophthalamide |
| H 1 | 90% PA, viscosity 3.5 10% polyhexamethyleneisophthalamide |
| J 1 | polyhexamethyleneisophthalamide |
| K 1 | Polytrimethylhexamethyleneterephthalamide. All measurements were carried out at a stretching temperature of 60° C. |

-continued

Figure 6:
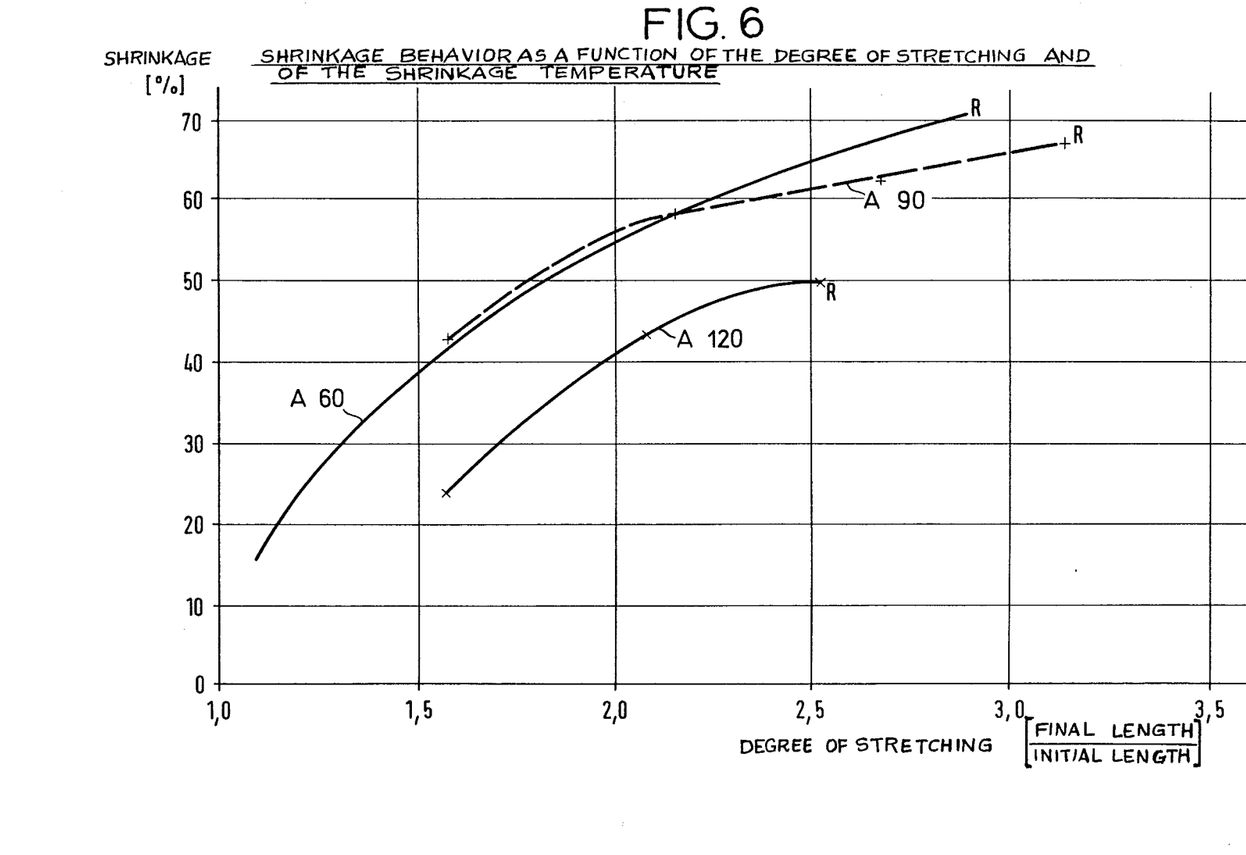
FIGS. 6 and 8 are graphs of the variation in shrinkage with the degree of stretching and shrinkage temperature.

| FIG. 6: | Shrinkage behavior as a function of the degree of stretching and of the stretching temperature. The film consists of a mixture of 75% polyhexamethyleneisophthalamide and 25% PA 6, viscosity 4. |
|---|---|
| Curve: | |
| A 60 | stretching at 60° C. |
| A 90 | stretching at 90° C. |
| A 120 | stretching at 120° C. |
| FIG. 7: | Stretching force as a function of the degree of stretching and of the stretching temperature. The composition of the film is the same as that of FIG. 6. |
| Curve: | |
| A 60-1 | stretching at 60° C. |
| A 90-1 | stretching at 90° C. |
| A 120-1 | stretching at 120° C. |
| FIG. 8: | Shrinkage behavior as a function of the degree of stretching and of the stretching temperature. The film is a mixture of polyhexamethylenephthalamide and a copolyamide consisting of more than 90 weight percent of ε-caprolactam, 3-aminomethyl-3,5,5-trimethylcyclohexylamine and isophthalic acid. |
| Curve: | |
| L 60 | stretching at 60° C. |
| L 90 | stretching at 90° C. |
| L 120 | stretching at 120° C. |
| FIG. 9: | Stretching force as a function of the degree of stretching and of the stretching temperature. The film is similar to that of FIG. 8. |
| Curve: | |
| L 60-1 | stretching at 60° C. |
| L 90-1 | stretching at 90° C. |
| L 120-1 | stretching at 120° C. |
| FIG. 10: | Shrinkage behavior of a polyamide/ethylene/vinyl acetate film as a function of the degree of stretching. The film consists of a polyamide layer, prepared from a mixture of 75 weight percent of PA 6 and 25 weight percent of polyhexamethyleneisophthalamide and a polyethylene layer of a copolymer of ethylene and vinyl acetate (3 weight percent) |
| FIG. 11: | Shrinkage behavior of different types of PA/PE films as a function of the degree of stretching. The PA/PE films are composite films. In all the films, the polyethylene layer consists of a homopolyethylene having a density of 0.922 g/cm³ and a melt index of 0.85 g/10 min. The polyamide layers have the following compositions: |
| Curve: | |
| Q | 80 weight percent of PA 66 20 weight percent of polyhexamethyleneisophthalamide |
| S | 50 weight percent of PA 66 25 weight percent of polyhexamethyleneisophthalamide 25 weight percent of a copolymer of more than 90 weight percent of ε-caprolactam, 3-aminomethyl-3,5,5-trimethylcyclohexylamine and isophthalic acid |
| T | 50 weight percent of PA 66 25 weight percent of copolyamide 6/66 25 weight percent of polyhexamethyleneisophthalamide |
| V | Copolymer of more than 90 weight percent of ε-caprolactam, 3-aminomethyl-3,5,5-trimethylcyclohexylamine and isophthalic acid. |

The invention is explained in greater detail in the following by means of examples, which relate to the advantageous developments of the invention.

Figure 8:
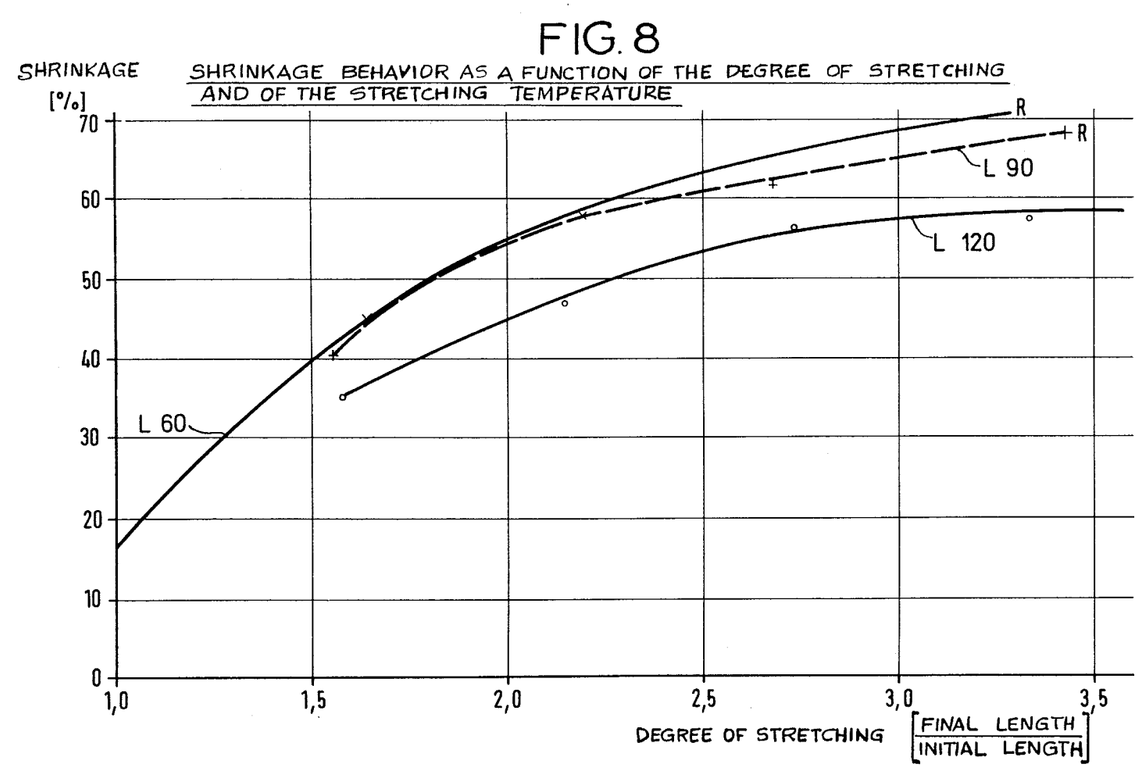
Figure 9:
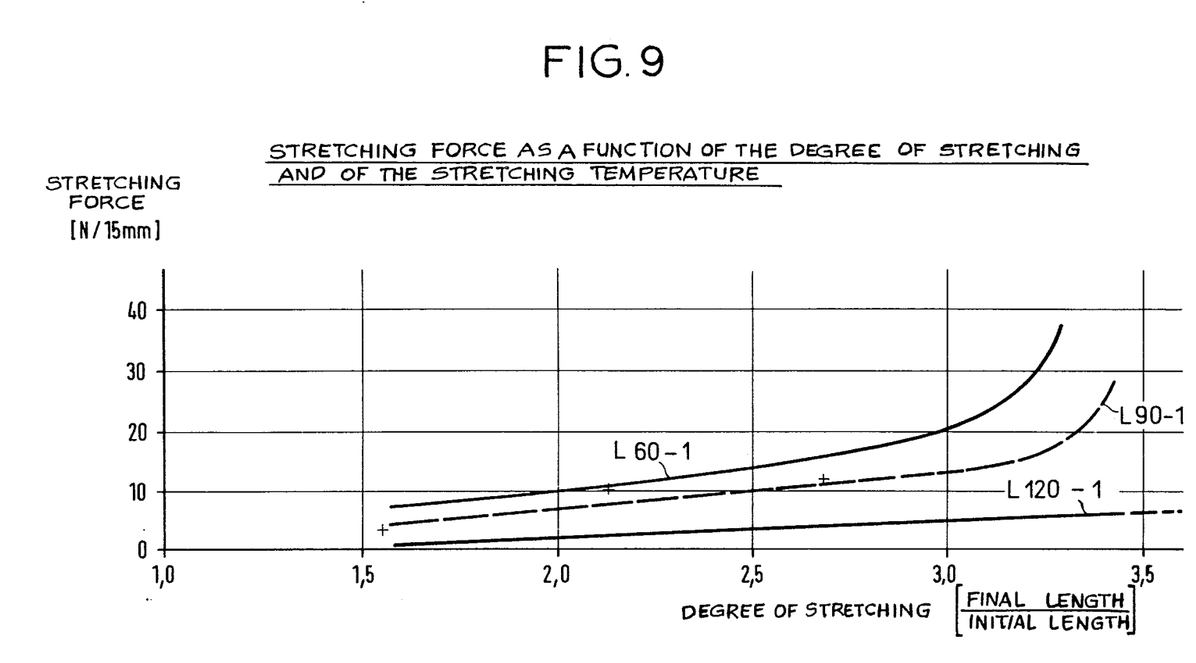

EXAMPLE 1 corresponds to the film of FIGS. 8 and 9. The film is prepared by mixing 50 weight percent of a copolyamide from ε-caprolactam, 3-aminomethyl-3,5,5-trimethylcyclohexylamine and isophthalic acid, with an ε-caprolactam content of more than 90%, a melting point of 214° to 217° C. and a gross density of 1.1 g/cc according to DIN 53479 and 50 weight percent of a partially aromatic polyamide, prepared from hexamethylenediamine and isophthalic acid (=polyhexamethyleneisophthalamide), with a melting temperature of approximately 180° C. and a gross density of 1.19 g/cc.

The two granulates are mixed together on a conventional, commercial tumble mixer and processed to a flat film, 1.060 mm ±10% thick in an extruder with a flat-flim die, chill rolls and wind-up unit, which is customarily used in the industry and is suitable for processing polyamide granules. The film is relatively rigid, has a crystal clear appearance and is subsequently stretched.

In order to determine the stretchability and shrinkability of the film, the following procedure is followed: A section of film is freely stored for 48 hours in a standard atmosphere of 23° C. and 50% relative humidity, in order to bring about a state of equilibrium between the moisture content of the surroundings and the moisture content of the film. Subsequently, 15 mm wide test strips are cut from the film in the longitudinal direction, that is, in the direction of extrusion. Each test strip is marked with lines corresponding to the clamping length of 50 mm and fixed in the clamps of a tensile testing machine corresponding to DIN 51221. The test strip is then heated for about 20 seconds with a stream of air heated to 60° C., 90° C. or 120° C. A hot air blower was used for this purpose, whose temperature could be adjusted continuously. The respective treatment temperature was adjusted by measuring the stream of warm air at a distance of 20 mm from the end of the jet until a constant temperature was reached. The same distance was used while heating the test strip in the tensile testing machine. After the preheating time, the sample was heated on one side by being fanned uniformly (moving the hot air up and down along the sample), while the lower clamp of the tensile testing machine was moved downwards uniformly at a rate of 100 min/min. After stepped degrees of stretching (that is, the ratio of the remaining final length between the marks to the original length), in each case one strip of film is stretched uniaxially for a given distance. The stretching force at the end of the stretching process is read on a force measuring device of the tensile testing machine.

After equilibrating elastic elongations by keeping the test strips in a flat and unrestrained position for at least 15 minutes in a standard atmosphere, the new distances between the test marks are measured with a scale with 1 mm subdivisions and determined as the final lengths. Subsequently each of the strips receives an additional weight of 0.2 g, attached to the lower end, in order to enable the strip to be immersed satisfactorily in a liquid bath. During 5 seconds, each strip is exposed to a heat treatment by a rapid immersion in a water batch at 95°±1° C. As a result, the strip shrinks by an amount depending on the degree of stretching. The new length, reduced by the shrinkage, is measured. The change in length between the stretched length and the residual length after the heat-shrinkage process is calculated as the percent shrinkage.

The results of the shrinkage values at the respective temperatures are given in FIG. 8, and the values of the stretching forces are given in FIG. 9.

EXAMPLE 2 corresponds to the film of curves G 1 and G 60 of FIGS. 4 and 5.

Polyamide 6 granulate (75%), with the relative solution viscosity of 4.0 according to DIN 53724, a melting temperature of 217° to 221° C. and and a gross density of 1.12 to 1.14 g/cc according to DIN 53479, is mixed as described in Example 1 with 25% polyamide from hexamethylenediamine and isophthalic acid with the data given in detail in Example 1. This mixture is processed into a film as described in Example 1. Here also, the film thickness is 0.060 mm±10%. The film has a highly transparent, crystal clear appearance. The rigidity is somewhat higher than that of the film described in Example 1.

The film is treated further by the laboratory stretching and shrinking procedures, described in Example 1. The shrinkage values are given as a function of the degree of stretching in curves G 60 and G 1 of FIGS. 4 and 5.

Figure 7:
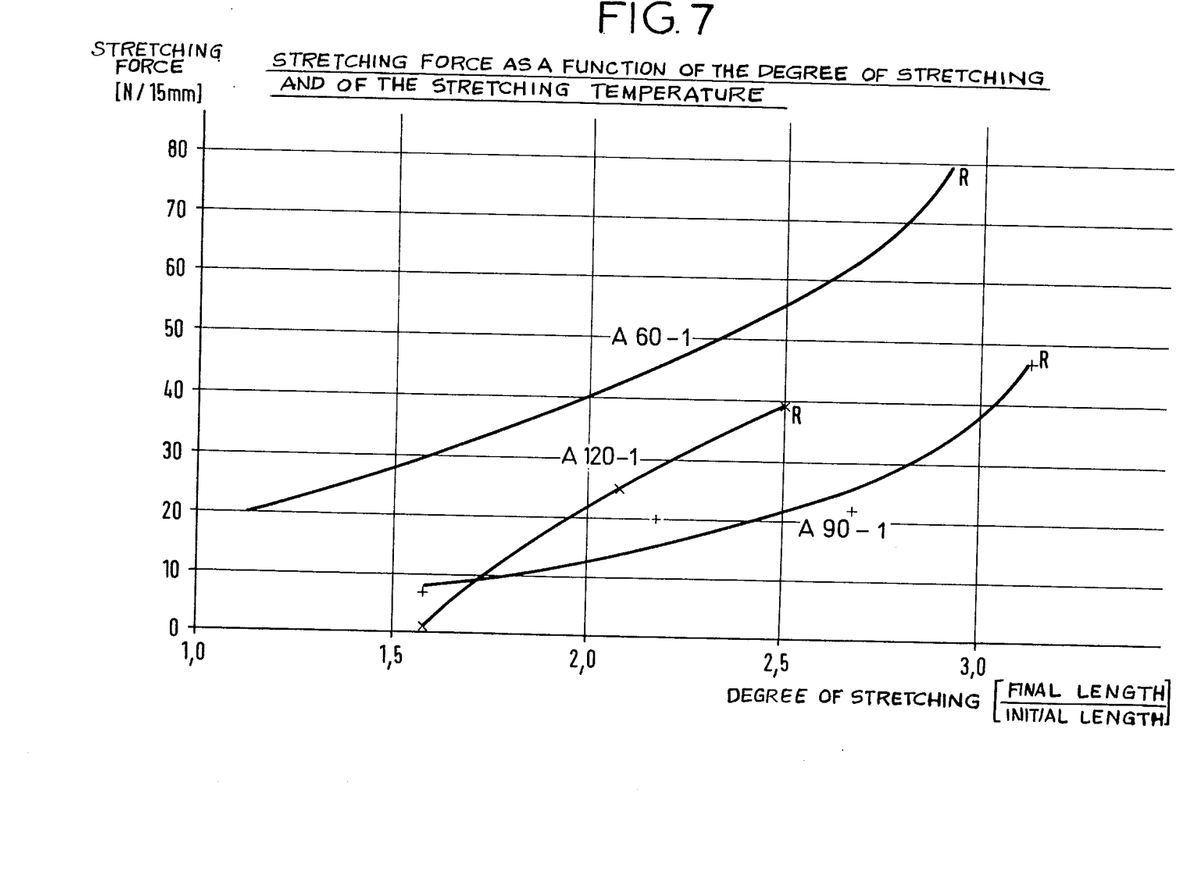
FIGS. 7 and 9 are graphs of the variation in stretching force with the degree of stretching and stretching temperature.

EXAMPLE 3 corresponds to the film of FIGS. 6 and 7.

Polyamide 6 granulate (25 weight percent), as described in Example 2, is mixed by the procedure already given with 75 weight percent of polyamide from hexamethylenediamine and isophthalic acid, as described in Examples 1 and 2.

A film, 0.060 mm±10% thick, is prepared from this granulate mixture by the procedure already described. It has a highly transparent, crystal clear appearance, while the rigidity is higher than that of the films of Examples 1 and 2.

The evaluation of this film by the measurements described above leads to the shrinkage values given by the curves in FIG. 6, the corresponding stretching forces being by the curves in FIG. 7.

EXAMPLE 4 relates to the preparation of a composite film, which is stretched by thermoforming, and the preparation of a package from this film.

A polyamide film, like that of Example 1, is coated uniformly on conventional film laminating equipment with a polyurethane adhesive (polyester polyol+hexamethylenediisocyanate) dissolved in ethyl acetate, so that a solids residue of 2.6 g/m² was obtained after the solvent had evaporated off.

An ethylene/vinyl acetate copolymer film was laminated with its corona-treated side against the adhesive-coated side of the polyamide film by pressing the two films together in a laminating roll mill with a roll temperature of 75° C. The composite film was subsequently cured for 10 days at room temperature. In so doing, a firm bond was produced between the layers with a peel strength of 200 cN/10 mm of film width at a peel angle of 180 degrees.

The ethylene/vinyl acetate copolymer film was prepared from a granulate with a melt index of 0.8/10 minutes at 190/2.16 in accordance with DIN 53735, a gross density of 0.928 g/cc and a vinyl acetate content of 5% on conventional blow molding equipment with an average thickness of 0.120 mm.

After the blow-molding process, the tube was allowed to cool, placed in a flat position, subjected to a corona treatment, then divided in the usual manner into two individual sheets and fed to the laminating equipment for processing in the described manner.

The above-described polyamide/ethylene-vinyl acetate copolymer composite film was cut to a sheet width of 431 mm on a conventional reel trimmer and rolled up into a film roll of 100 running meters.

Preparation of the thermoformed package:

The film was heated on a vacuum forming machine, which is normally used for packaging foods such as sausages, hams, etc., with a hot-plate temperature of 90° C., and shaped under the effect of a vacuum on the underside of a vacuum mold as a result of a pressure different from the atmospheric pressure. In this procedure, the polyamide side was at the bottom. The mold was constructed as a double mold, the dimensions of each individual mold being 225 mm (length parallel to the running direction)×40 mm (depth). The cycle time was 5 per minute. Finely minced pork sausages were the filling material. The sausage skins were about 200 mm long and about 30 mm in diameter. Number: 5 sausages, parallel to each other in the longitudinal direction.

As covering film, a composite film was used, which consisted of a 0.040 mm thick polyamide 6 film and a 0.025 mm thick inner layer of a specially treated polyethylene, which makes it easy to open the package. The covering film was applied to the shaped and filled subfilm ahead of the heat-sealing station, the two polyethylene sides of the composite film being brought into contact with each other. The lattice-shaped heat-sealing tool had a temperature of 140° C. and was pressed onto the films, which were supported by a correspondingly shaped counter tool. The heat-sealing took place simultaneously with the evacuation of the interior space of the package. Behind the heat-sealing station, the machine was additionally equipped with shrinking equipment, consisting of a hollow chamber filled with hot air at approximately 140° C., which was brought around the lower part, in phase with the machine, by raising it against a guide plate above the covering film. The film wrapped itself tightly and without folds around the packaged material and the escape of juice from the packaged material was prevented completely by the tight encircling. The seam remained free of folds even after the shrinking process.

EXAMPLE 5

A polyamide film, like that of Example 2, was laminated, as described in Example 4, with a film of the same ethylene/vinyl acetate copolymer described in Example 4, the film thickness here however being 0.060 mm.

The stretching and shrinking behavior of the polyamide-ethylene-vinyl acetate film, so obtained, was tested in the laboratory under conditions like those employed for the film of Example 1.

Figure 10:
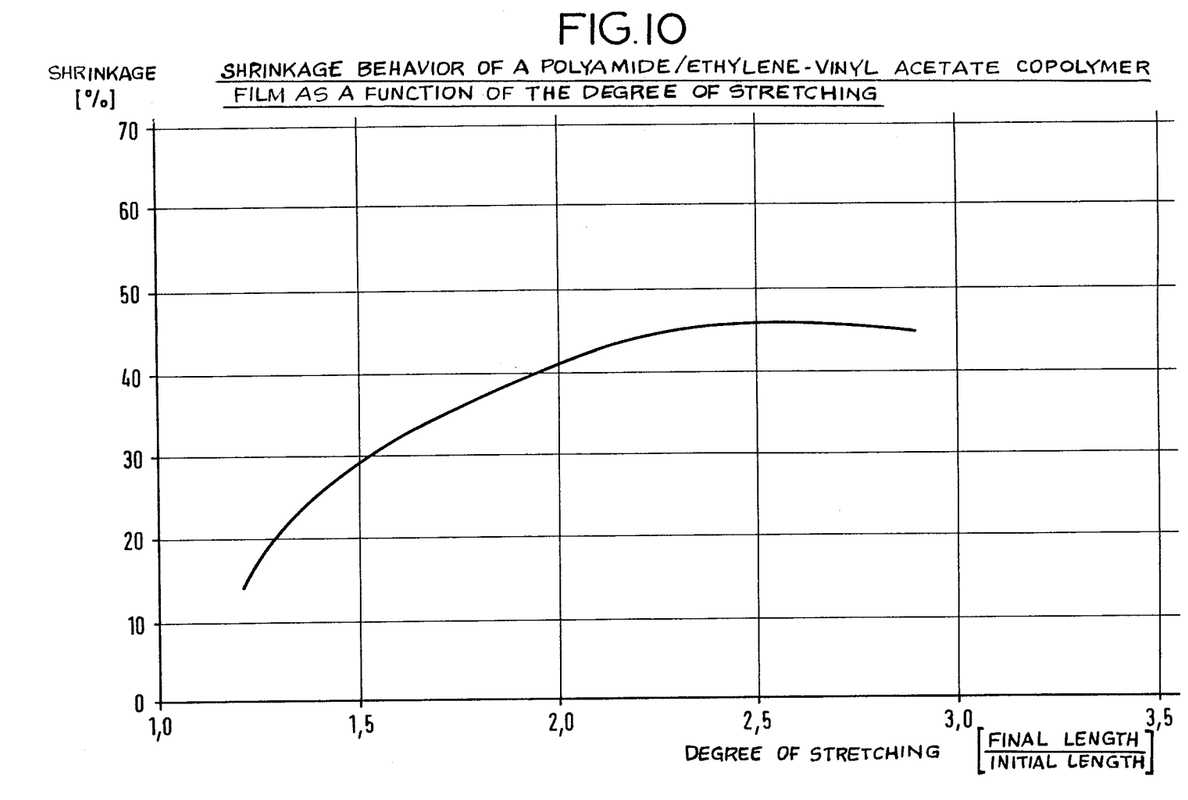

The results of the shrinkage values are given by the curve of FIG. 10.

EXAMPLE 6 describes the preparation of a coextruded composite film.

A polyamide/polyolefin composite film is prepared by coextrusion using the blow-molding process.

The coextrusion blow molding unit consists of an extruder 1 for the polyamide layer, a single screw extruder with a 60 mm screw diameter, a screw length of 27 D, a 3-zone screw with a mixing part in the metering zone, an extruder 2 for the layer of adhesion mediator, a single screw extruder with a 30 mm screw diameter of the high-speed type and an adiabatic mode of operation;

an extruder 3 for the polyolefin layer, a single screw extruder with a 60 mm screw diameter, a grooved and cooled feed bush and a screw length of 27 and a mixing part in the metering zone.

In order to prepare the film, described in the following on the above described 3-layer coextrusion film equipment, the following procedure is followed:

In extruder 1:
60 parts by weight of a linear copolyamide consisting of
  85 weight percent of ε-caprolactam
  15 weight percent of a polyamide from hexamethylenediamine and adipic acid
40 parts by weight of a partially aromatic polyamide consisting of
  isophthalic acid and hexamethylenediamine with a melting point of about 180° C. (Kofler method) and a density (DIN 53 479) of 1.185 g/cc are mixed intensively as granulates and supplied as a melt to the 3-layer tube die at a rotational speed of 52 per minute and temperatures of 240° C. in the extruder barrel and in the flange parts.

In extruder 2, the adhesion mediator, consisting of ionomeric resin (with the trade name of SURLYN A 1705 from du Pont with zinc as cation) is run with an rotational speed of 80 per minute and a barrel and flange temperature of 210° C.

In extruder 3, LD-PE, produced by the high-pressure process, with a density of 0.922 g/cc and a melt index of 0.85 g/10 minutes (with the trade name of STAMYLAN 3729X(DSM, NL-Zeist) is extruded as inner layer at a rotational speed of 44 per minute and a barrel and flange temperature of 180° C.

The 3-layer tube die, which is supplied by all 3 product melts, has an annular slit diameter of 300 mm, a slit width of 1.2 mm and a temperature of 260° C.

The total thickness was determined to be 0.160 mm. Of this amount, 0.055 mm were due to the polyamide layer, 0.015 mm to the layer of adhesion mediator and 0.090 mm to the polyethylene layer.

The film, produced at a blow-up ratio of B=1.8:1, was cut into individual sheets and wound up. The film had a very good transparency.

Test strips, stretched as described in Example 1, gave the following results in the shrink test described in Example 1:

| Degree of Stretching | Shrinkage (in %) |
| --- | --- |
| 2.0 | 44 |
| 2.5 | 49.4 |
| 3.0 | 54. |

This film is therefore outstandingly suitable for shrink-wrapping.

EXAMPLE 7 describes the preparation of another coextruded composite film, which is stretched by thermoforming.

By means of the 3-layer tubular film coextrusion, as described in Example 6, a film is prepared consisting of
  I. polyamide with a layer thickness of 35 μm
  II. ionomeric resin, like that used in Example 6 as adhesion mediator, with a layer thickness of 15 μm and III. polyethylene, like that in Example 6 with a layer thickness of 96 μm.

Polyamide layer I. consists of a mixture of 50 weight percent of polyamide 66

25 weight percent of copolyamide 6/66

25 weight percent of polyhexamethyleneisophthalamide.

By intensively mixing the granulates before the extrusion and homogenizing the melt, these components were extruded in an extruder with a mixing zone screw into a homogeneous polyamide layer.

For the polyamide extruder, the barrel temperature is raised to 280° C. and the temperature of the tube die was adjusted to 270° C. All the remaining parameters were similar to those given in Example 6.

The film, so prepared, is cut as a single sheet to a width of 420 mm and is processed on a vacuum forming machine, like that in Example 4, with the same parameters and a cycle time of 4 and 8 per minute. The improvement obtained is shown by the fact that no operating problems whatsoever were observed even at the high cycle time and the elevated heat-sealing temperature.

The coextruded composite film of Example 7 corresponds to A curve T of FIG. 11. The strip stretching, represented there, is in good agreement with the stretching by thermoforming, which has been described.

I claim:

1. A transparent, shrinkable film comprising at least one layer of a polyolefin and at least one layer is of a polyamide composed of a mixture of
   85 to 10 weight percent of a linear polyamide, linear copolyamide, or an elastomeric component selected from the group consisting of polybutadiene, mixtures of polyamides and polybutadiene, mixtures of polyamide and nitrile rubber, block copolymers of polyether segments and polyamide segments; and
   15 to 90 weight percent of a partially aromatic polyamide or partially aromatic copolyamide,
said film having been stretched at a temperature below 120° C.

2. The film of claim 1 wherein the polyamide of said at least one layer is a mixture of
   80 to 40 weight percent of a linear polyamide, a linear copolyamide, or an elastomeric component; and
   20 to 60 weight percent of a partially aromatic polyamide or partially aromatic copolyamide.

3. The film of claim 1 or 2 wherein the partially aromatic polyamide is polyhexamethylene isophthalamide.

4. The film of claim 1 or 2 wherein the partially aromatic polyamide is polytrimethylhexamethylene terephthalamide.

5. The film of claim 1 or 2 wherein the linear polyamide is polyamide 66.

6. The film of claim 1 or 2 wherein the polyamide of said at least one layer is a mixture of 40 to 60 weight percent of polyamide 66,
   20 to 30 weight percent of partially aromatic polyamide, and
   20 to 30 weight percent of amorphous linear copolyamide.

7. The film of claim 1 or 2 wherein the film is stretched at temperatures between 60° and 90° C.

8. The film of claim 1 or 2 wherein the stretching is accomplished by a vacuum deep drawing process.

9. The film of claim 1 or 2 wherein the polyolefin layer consists of a polyolefin with a high shrinkage force.

10. The film of claim 1 or 2 wherein the polyolefin layer consists of an ionomeric resin.

11. The film of claim 1 or 2 wherein the polyolefin layer consists of an ethylene copolymer.

12. The film of claim 11 wherein the polyolefin layer consist of mixtures of different ethylene copolymers.

13. The film of claim 12 wherein the polyolefin layer consist of polyethylene types of low density with a linear molecular structure.

14. The film of claim 13 wherein the polyolefin layer consists of mixtures of ethylene homopolymers and ethylene copolymers.

15. The film of claim 1 or 2 wherein there is more than one layer and the layers are glued together.

16. The film of claim 1 or 2 wherein the layers are coextruded.

* * * * *